May 27, 1941.    C. P. GRIFFITH    2,243,559
SELF-CLEANING FILTER
Filed June 20, 1938    5 Sheets-Sheet 5
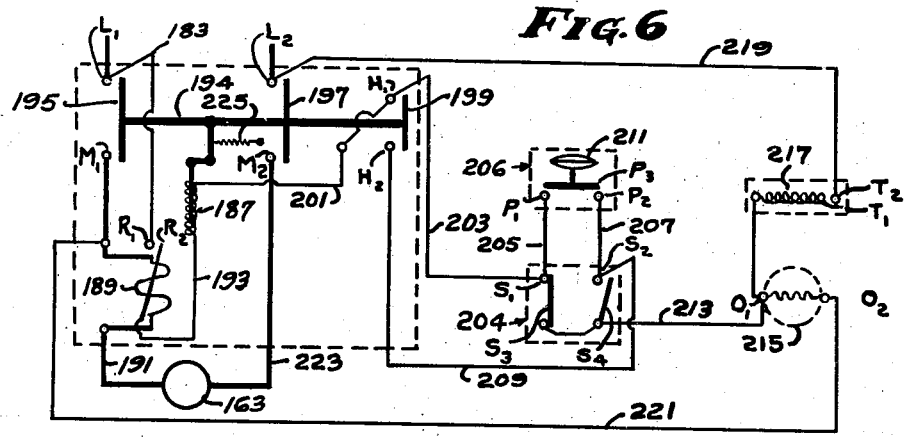
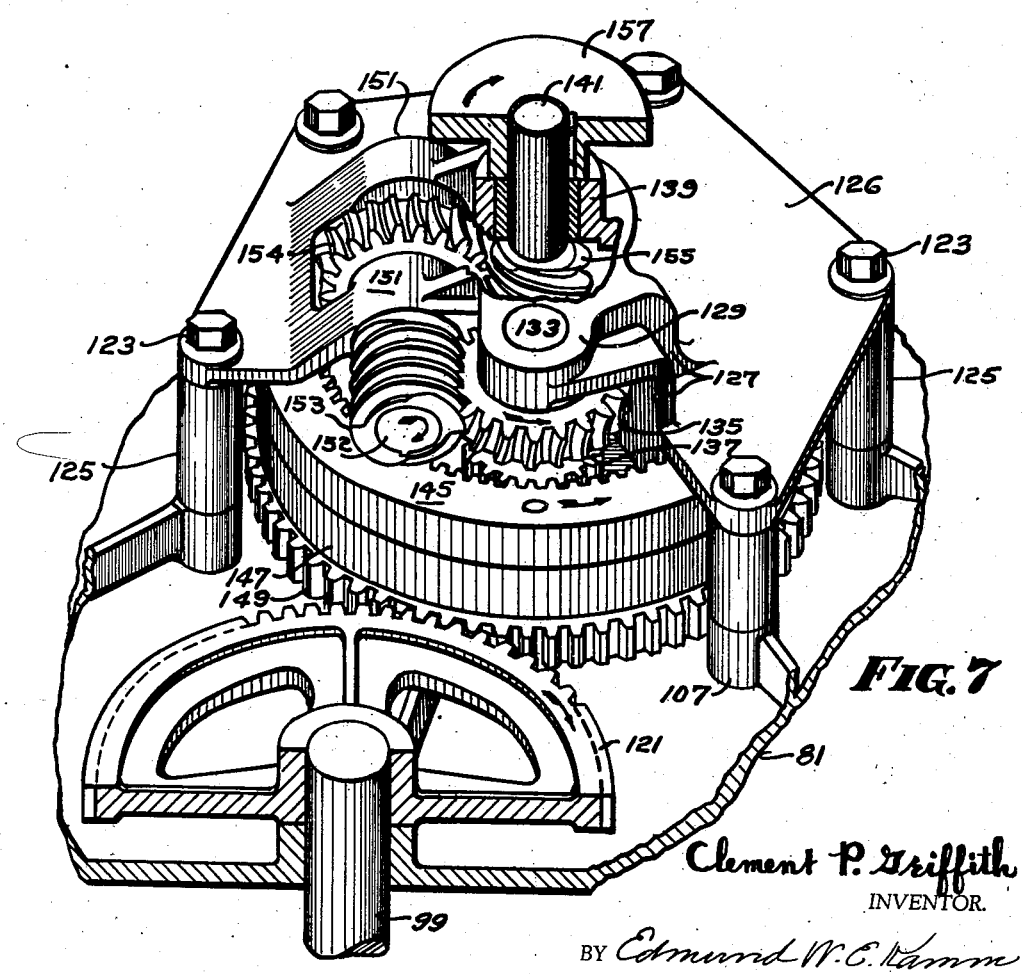
Clement P. Griffith
INVENTOR.
BY Edmund W. C. Kamm
ATTORNEY.

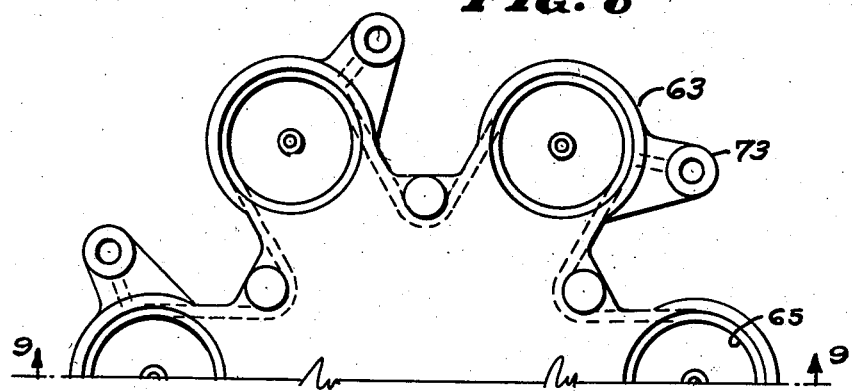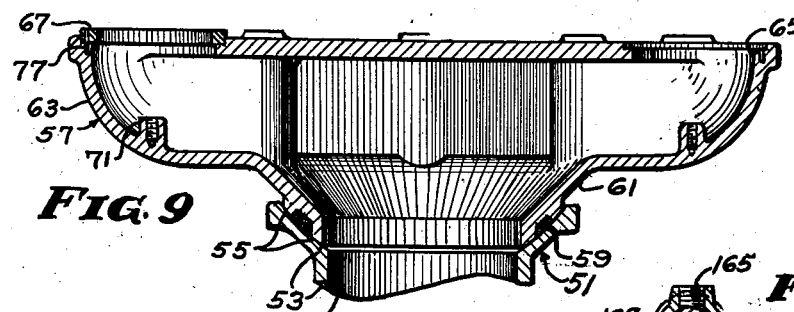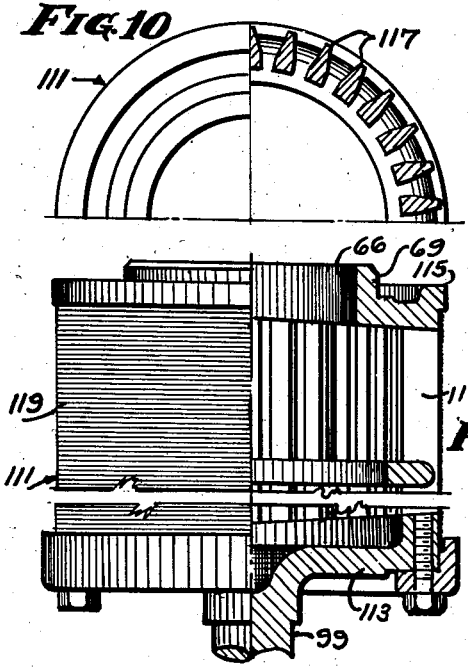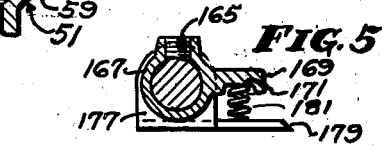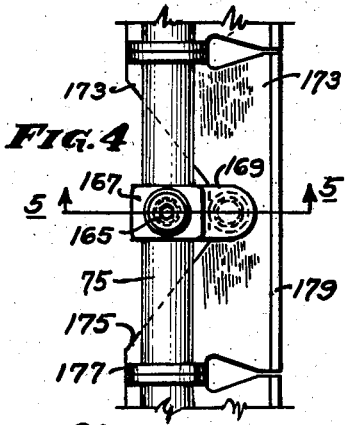
Clement P. Griffith
INVENTOR.
BY Edmund W. E. Kamm
ATTORNEY.

Patented May 27, 1941

2,243,559

UNITED STATES PATENT OFFICE 2,243,559

SELF-CLEANING FILTER

Clement P. Griffith, Fort Wayne, Ind., assignor to S. F. Bowser & Company, Incorporated, Fort Wayne, Ind., a corporation of Indiana Application June 20, 1938, Serial No. 214,645

10 Claims. (Cl. 210—184)

This invention relates to self-cleaning filters or strainers and more particularly to filters or strainers employing elements which are mounted for rotation relative to stationary scraper blades which serve to remove accumulated cake, and in which the scraping cycle is extended until a predetermined pressure differential is attained.

An object of the invention is to provide automatic means for setting the cleaning mechanism in motion when the back pressure rises to a predetermined magnitude.

A further object of the invention is to provide a filter or strainer from which the filter elements can readily be removed and replaced.

Still another object of the invention is to provide a novel strainer element which comprises a wire, wound helically upon a cage and fastened thereto.

A further object of the invention is to provide a compact element driving system.

Yet another object of the invention is to provide a novel scraper unit in which a plurality of scrapers are individually held against the filtering element.

Another object of the invention is to provide a scraper unit having a plurality of scrapers which are yieldably held against the filtering element.

Still another object of the invention is to provide a scraper unit having a plurality of scrapers which are individually adjustable, toward or from the elements.

Another object of the invention is to provide a control circuit by means of which the scraping operation is interrupted by thermal control means to prevent damage to apparatus in the circuit.

Yet another object of the invention is to provide a control circuit by means of which the scraping cycle is intermittently interrupted and restarted and then is finally interrupted.

A further object of the invention is to provide a control circuit by means of which the intermittent scraping action may be effected continuously or in cycles initiated and terminated in accordance with the pressures.

These and other objects will become apparent from a study of the specification in connection with the accompanying drawings in which:

Figure 4 is an elevation of one scraper blade in assembled relation on the supporting shaft.

Figure 5 is a section of the mechanism of Figure 4 taken on the line 5—5 thereof.

Figure 6 is a diagrammatic view showing the electrical control system.

Figure 7 is a perspective view showing the reduction gearing.

Figure 8 is a partial plan view showing the details of the manifold.

Figure 9 is a sectional view taken on the line 9—9 of Figure 8 showing the manifold and part of the inlet conduit.

Figure 10 is a partial plan view of a filter element with a portion cut away to show the supporting structure.

Figure 11 is an elevation partially in section showing the winding of the filter element and the supporting structure.

Shell construction and manifold

Figure 1:
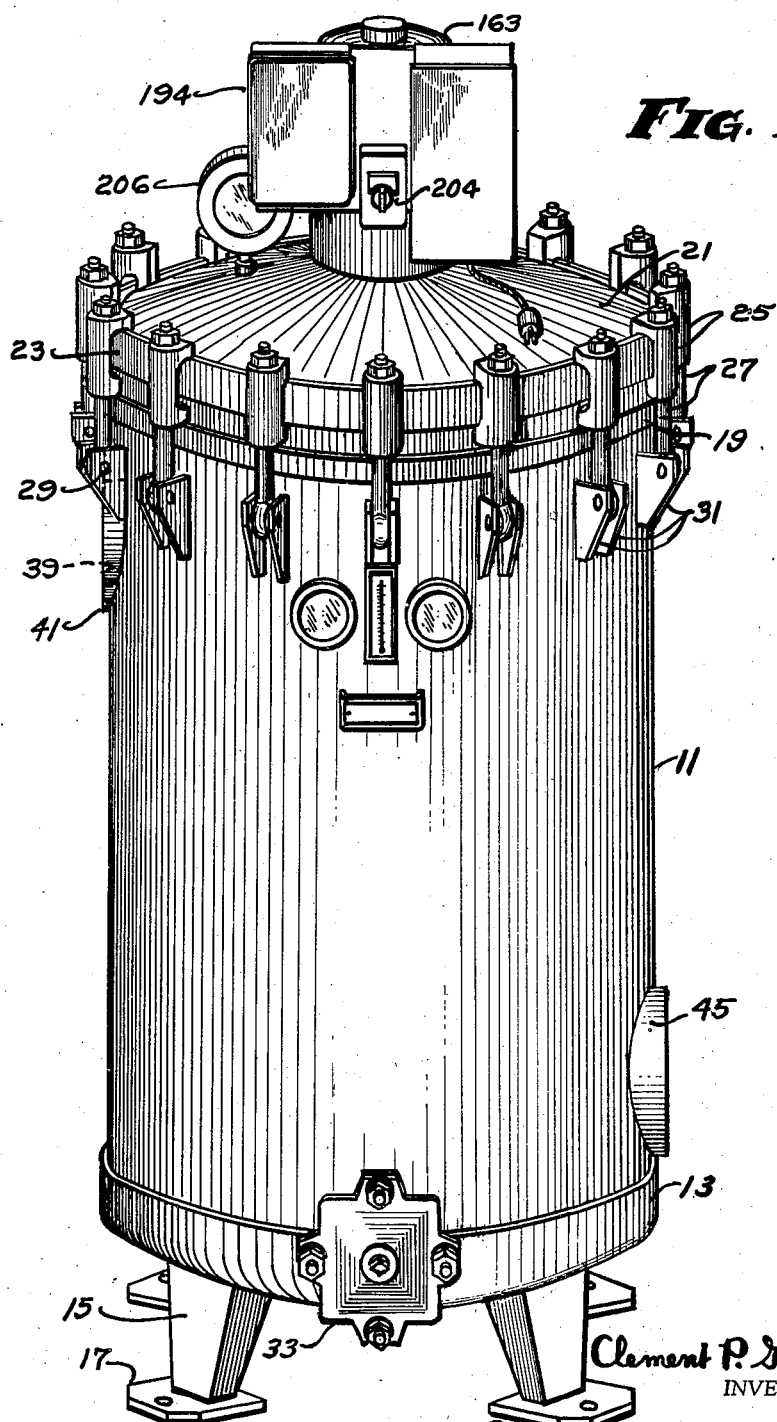
Figure 1 is a perspective view of the exterior of the apparatus.
Figure 2:
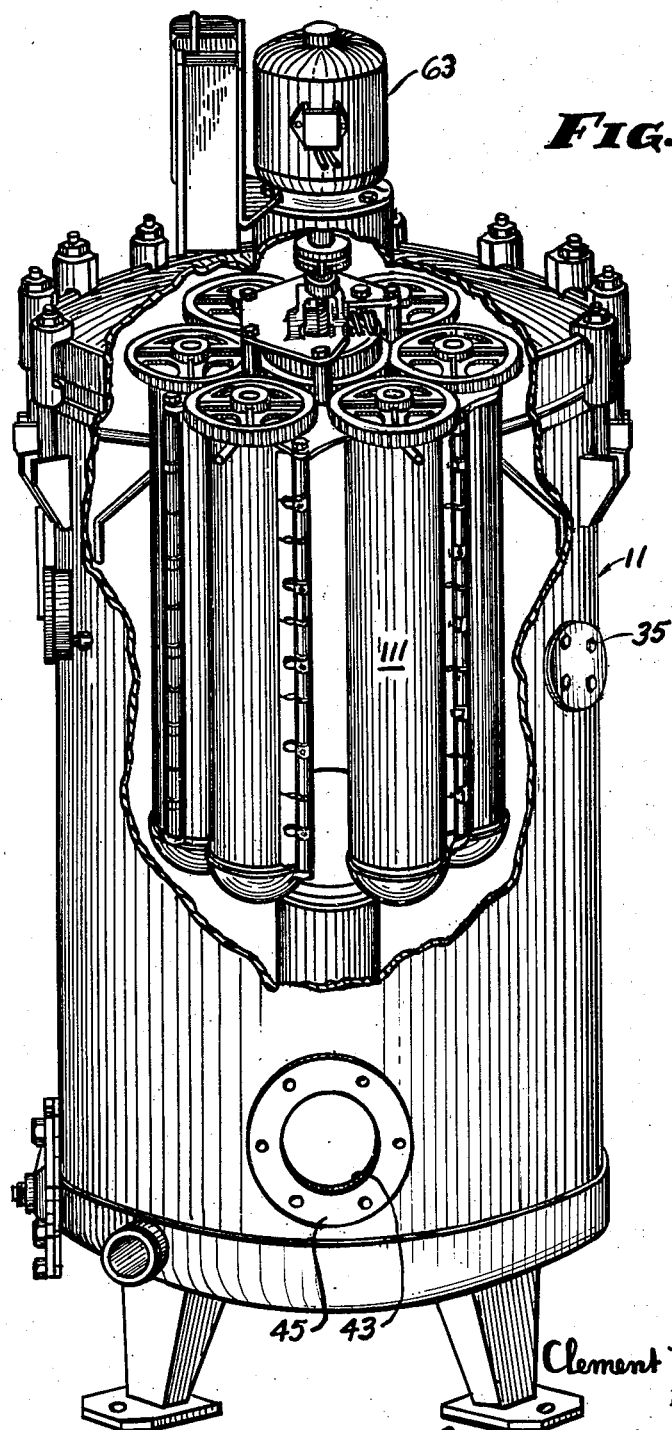
Figure 2 is a perspective view of the apparatus parts broken away to show the filter elements, scrapers, drive mechanism and other parts in assembled relation in the shell.

The numeral 11 indicates a cylindrical shell which has integrally attached thereto a bottom head 13 on which are fixed leg members 15 having foot pieces 17. Surrounding the upper end of the shell, a ring 19 is attached for the purpose of retaining a gasket (not shown) which is adapted to rest on the upper circular edge of the shell.

An upper head 21 is removably mounted on the shell with its lower circular edge resting upon the gasket and in alignment with the upper circular edge of the shell. Thus, a seal is formed between the upper head and shell.

A clamping ring 23 is fixedly attached to the head as by welding and is adapted to be engaged by clamping members 25 which are slidably mounted on clamping bolts 27 which are in turn pivoted on pins 29 set in pairs of lugs 31 mounted on the shell. By drawing down on the nuts mounted on the clamping bolts, the upper head may be evenly and securely held on the gasket.

An inlet opening 39 is formed in the shell 11 near its upper end and is surrounded by a boss 41 which is provided with suitably tapped holes so that the flange of the inlet line may be readily attached. Suitable cleanout and inspection openings 33 and 35 respectively, are provided in the shell.

An outlet opening 43 is provided in the shell 11 at its lower end and is surrounded by a boss 45 which is also provided with tapped holes so that the flange of the outlet line may be readily attached.

Figure 3:
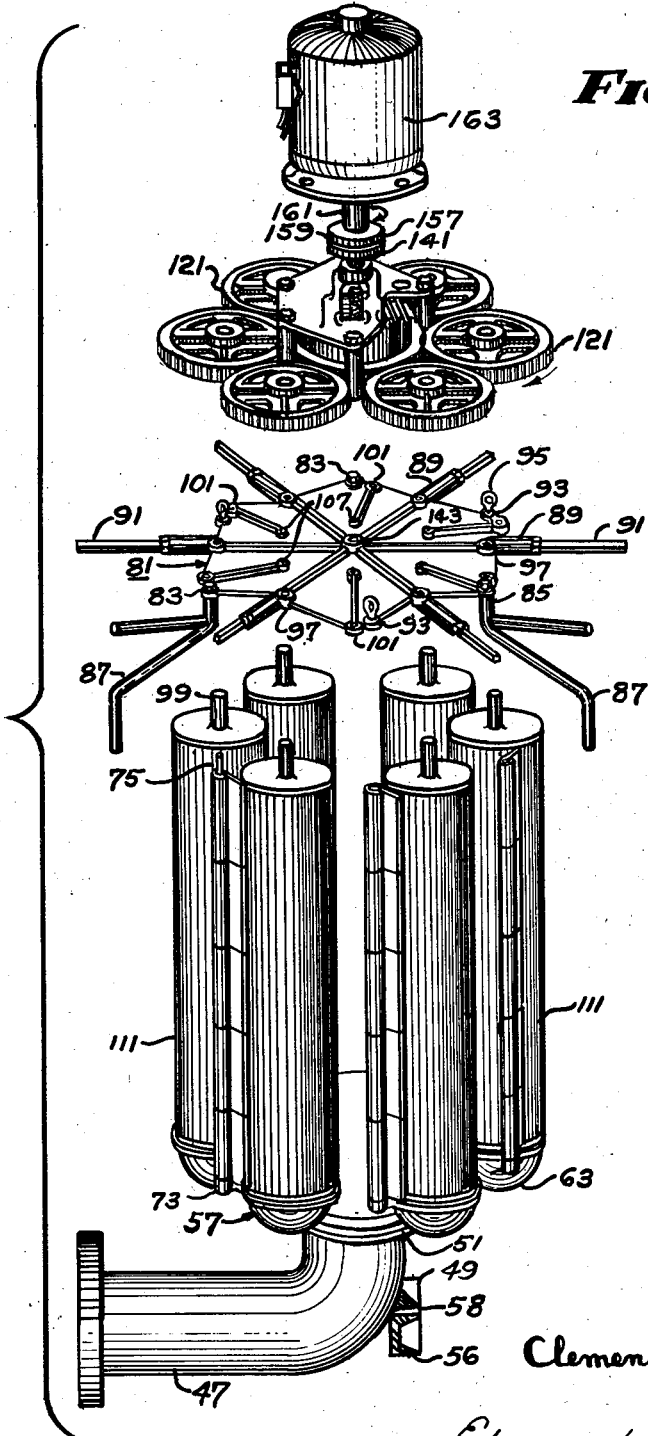
Figure 3 is a perspective exploded view of the parts of Figure 2 removed from the shell.

A conduit 47 leads from the opening, radially inwardly to the axis of the shell where it turns ninety degrees, upwardly as shown in Figure 3. The axis of the upwardly extending portion 49 of the conduit is coaxial with the shell and is formed with a bell mouth 51 (see Figure 9). The interior of the bell is formed with a spherical seat portion 53 which is adapted to receive a spherical bearing 55 formed on the manifold 57.

In Figure 3 is shown a channel member 56 which has its ends fixed to the shell 11 and which extends under a projection 58 on the conduit 47 and serves to support it and the weight of a portion of the apparatus mounted on it.

The spherical surface 55 is divided by a circular groove 59 which receives packing for sealing the joint.

Any inverted truncated cone 61 serves to join the spherical bearing with the header portion of the manifold which comprises a plurality of radially extending projections 63 which have upwardly facing openings 65 therein which are adapted to receive the lower ends of the filtering elements as will be seen. The interior of this manifold forms a filtrate chamber.

Each opening 65 is provided with a cylindrical bushing 67 and is adapted to receive the journal 69 on the filter element (Figure 11) to prevent passage of liquid therebetween. The bushing is held in place by means of dowel pins 77.

A tapped boss 71 is provided in the manifold in axial alignment with each of the openings 65 to receive a bolt which is adapted to hold a sealing plate over the opening 65 in the event it is desired to omit the filtering elements which would otherwise occupy the opening.

Each of the projections 63 are provided with an outwardly extending boss 73 which is perforated to receive a combined space rod, tie-rod, and scraper shaft 75 which runs to the upper head later to be described.

Upper head construction

The upper head (Figure 3) indicated generally by numeral 81 is a substantially flat plate, ribbed for strength and provided at its edge with three bosses 83 which are perforated to receive the upwardly projecting stem 85 of a guide bracket 87 which is fixed to the inside of shell 11. A nut threaded on each stem holds the head in place.

Six radially outwardly directed bosses 89 are drilled and tapped to receive adjustable guide studs 91, which after being adjusted to the internal diameter of the shell are locked in place by lock nuts.

Three equally spaced perforated bosses 93 similar to bosses 83 are provided with eye-bolts 95 to facilitate the removal of the filtering mechanism from the shell.

Six perforated bosses 97 located at the base of bosses 89 are provided to receive the shafts 99 of the filter elements which project therethrough.

Six other equally spaced perforated bosses 101 are provided to receive the upper ends of the scraper shafts 75. These perforations are smooth and the shafts are held in place by nuts screwed on the shafts on opposite sides of the bosses.

Perforated bosses 107 are provided intermediate the center and edge of the head and are tapped to receive screws 123 which retain the gear assembly in place.

Filtering element construction

The filtering elements comprise a cage 111 having heads 113 and 115 and longitudinal ribs 117 forming a series of bars upon which may be mounted the helically wound filter wire 119. The upper head 113 is provided with a shaft 99 which, as described above, projects through the head 81.

The lower head is provided with a journal 69 which is adapted to be received in the bearing 67 as described.

This lower head is provided with an axial opening 66 which passes through the journal so that the interior of the element will be in communication with the conduit 47.

The filter wire may be that disclosed in the patent to Liddell, Number 2,042,537, issued June 2, 1936, or it may be simply a round wire preferably of "Monel metal" which is wound in a helix having a pitch greater than the diameter of the wire so that a helical opening will be left between adjacent turns. In the round wire construction, after the element is wound, the wire is soldered to the cage so as to maintain the size of the filtering opening constant.

Reduction gearing

A gear 121 is keyed on each of the shafts 99 above the surface of head 81. All of the gears lie in a common plane but do not mesh with each other.

Mounted in openings in bosses 107 on the head (see Figures 3 and 7) are cap screws 123 which are surrounded by spacers 125 which serve to support a gear supporting plate 126 in spaced relation with respect to said head.

An arm 127 (Figure 7) is formed integrally with plate 126 and supports a boss 129 in which is carried a stud 133. A worm gear 135 and a spur gear 137 are formed integrally and mounted on the stud with the worm gear uppermost.

A boss 139 is also supported by the arm 127 in parallel relation to boss 129 and shaft 141 is journalled in the boss 139 and in the opening in the central boss 143 of the head 81 (Figure 3). A ring gear 145 is mounted on a flange 147 of a gear 149 which is loosely mounted on shaft 141 in meshing relation with the gears 121 on the filter elements. The ring gear meshes with the spur gear 137 described above and is adapted to be driven thereby.

Two horizontally spaced bosses 151 are formed integrally with plate 126 and serve to rotatably support a shaft 152 on one end of which is mounted a worm 153 which drives the worm wheel 135. A worm wheel 154 is mounted to drive the shaft 152 and is adapted to be driven by a worm 155 which is fixed to rotate with shaft 141.

One-half of a coupling 157 is attached to the upper end of shaft 141 while the complementary half 159 of the coupling is mounted on the lower end of a shaft 161 which is the armature shaft of an electric motor 163.

Scraper assembly

Fixed to each of the shafts 75 by means of set screws 165 or other suitable fastenings are a plurality of scraper hubs 167 (Figures 4 and 5). Each hub comprises a radially extending arm 169 having a tangentially directed spring seat 171 formed therein. The scraper blades indicated generally by numeral 173 are formed with a central notch 175 which serves to clear the hub and with bent up ears 177 at each end which are perforated to receive shaft 75. The blades are sharpened at the edge 179 which bears against the filtering unit. A spring 181 is received at one end in seat 171 and its other end bears against the scraper blade. The blades are so mounted on shafts 75 that they extend between the shafts and the filter element upon which they operate.

Motor control system

In Figure 6, numerals $L_1$ and $L_2$ represent contacts leading to the power supply line while $M_1$ and $M_2$ represent contacts which are connected to the motor 163 by lines 191 and 223 respectively. Contacts $H_1$ and $H_2$ are connected in a holding circuit which will be described.

$R_1$ and $R_2$ represent the contacts of a thermal relay which is controlled by a heating coil 189 in the line 191 which connects the motor with contact $M_1$. Contact $R_1$ is connected with contact $L_1$ by a line 183 while contact $R_2$ is connected with one side of coil 187 by line 193.

A switch 194 comprising contacts 195, 197 and 199 which close contacts $L_1$, $M_1$; $L_2$, $M_2$; and $H_1$, $H_2$, respectively, is connected to be operated to its closed position when coil 187 which is connected in line 193 is energized.

A line 201 connects coil 187 with contact $H_1$ and a line 203 connects $H_1$ with a contact $S_1$ of a selector switch indicated generally by numeral 204 while a line 205 connects $S_1$ with a contact $P_1$ of a pressure operated switch 206.

The other contact $P_2$ of the pressure switch is connected by line 207 to the other contact $S_2$ of the selector switch 204 which in turn is connected by line 209 to the contact $H_2$.

Pressure switch 206 may be of any suitable type. As shown, it comprises a diaphragm 211 which actuates a switch element $P_3$ which is moved into engagement with contacts $P_1$ and $P_2$ as the pressure in the filter shell 11 increases beyond a predetermined amount.

Selector switch 204 may also be of any suitable design. As shown, it comprises pivotal contact elements $S_3$ and $S_4$ which may be moved into or out of engagement with the terminal $S_1$ and $S_2$ respectively. Either one or the other of the pairs of contacts are in engagement at all times.

Both contacts $S_3$ and $S_4$ are connected by line 213 to terminal $O_1$ of a resistor 215 and to a thermostatic switch or "Thermotector" 217 which comprises contacts $T_1$ and $T_2$ which are adapted to be opened as a thermostatic element, connected in series with them, heats, and adapted to be closed by the element as it cools. The contact $T_2$ is connected by means of line 219 to contact $L_2$ described above.

The terminal $O_2$ of the resistor 215 is connected by line 221 to the contact $M_1$ through line 191.

Operation

Contaminated liquid such as lubricating oil, etc., is pumped into the filter shell 11 preferably under pressure. The liquid flows through the filter surfaces of the filtering elements 111 and longitudinally thereof through the opening 66 and into the manifold 57 whence it flows through conduit 47 to a suitable receptacle.

As the liquid passes through the filtering surfaces, dirt, chips, scale and other impurities which are larger than the openings in the surface are caught and held while liquid and smaller particles pass through the surface.

Eventually a "cake" will form on the filtering surface and as a result the pressure in the shell will build up and the efficiency of the unit will be reduced.

When the pressure in the shell reaches a predetermined amount, the contacts $P_1$ and $P_2$ of pressure switch 206 will be connected by bar $P_3$. If it is assumed that the selector switch 204 is set for automatic operation, contacts $S_2$ and $S_4$ will be in engagement. Further, since no current has been flowing in any of the circuits, contacts $R_1$ and $R_2$ will be closed as will contacts $T_1$ and $T_2$.

Upon closing of the pressure switch as noted above, a circuit will be set up including contact $L_2$, line 219, contacts $T_2$ and $T_1$, "Thermotector" 217, terminal $O_1$, line 213, contacts $S_4$ and $S_2$, line 207, contacts $P_2$, $P_3$ and $P_1$, line 205, contact $S_1$ and line 203 to contact $H_1$, line 201 through the magnet coil 187 and by way of line 193, contacts $R_2$ and $R_1$ and line 183 to contact $L_1$.

The magnet coil being thus energized connects the motor in a circuit which comprises contacts $L_1$, 195 and $M_1$, heater coil 189, line 191, motor 163, line 223 and contacts $M_2$, 197 and $L_2$.

At the same time contacts $H_1$ and $H_2$ are connected by contact 199 to establish a holding circuit which maintains coil 187 energized independently of the position of the pressure switch 206. This circuit is from contact $L_2$, line 219, contacts $T_1$ and $T_2$, "Thermotector" 217, terminal $O_1$ and line 213, contacts $S_4$ and $S_2$, line 209, contacts $H_2$, 199 and $H_1$, line 201, coil 187, line 193, contacts $R_2$ and $R_1$, line 183 to contact $L_1$. Thus, control of coil 187 is placed in "Thermotector" 217 independently of the pressure switch.

At the same time, the closing of contacts $L_1$, 195, $M_1$ establishes a heating circuit through the resistor 215 from contacts $L_1$, 195, $M_1$, line 221, connections $O_2$ and $O_1$ to "Thermotector" 217, contacts $T_1$ and $T_2$, line 219 to contact $L_2$.

The effect of the coil 187 is such that only a small current will pass through it, and this current is not sufficient to heat the "Thermotector" 217. For this reason the separate heating circuit just described is necessary.

As "Thermotector" 217 heats and reaches a predetermined temperature, the contacts $T_1$ and $T_2$ will separate and break the holding circuit through coil 187 and a spring 225 shown diagrammatically in Figure 6 will move switch elements 195, 197 and 199 out of contact with their associated contacts and the motor will stop.

However, if the operation of the motor has not been sufficient to reduce the pressure in shell 11 to the required amount, the pressure switch 206 will still be closed and as soon as the "Thermotector" 217 cools, the contacts $T_1$ and $T_2$ will again engage and as a result the process will be repeated. When the pressure is reduced sufficiently to cause switch 206 to open, the operation of the motor will continue until the succeeding opening of the contacts $T_1$ and $T_2$ whereupon the cycle will be completed.

If, at any time during the operation of motor 163, the temperature of the heating coil 189 rises above a predetermined magnitude, the contacts $R_1$ and $R_2$ will be separated to break the circuit through the coil 187 and this causes the motor circuit to be opened as described above. When the coil 189 cools and contacts $R_1$ and $R_2$ again engage, and if pressure switch 206 is still closed, the motor will again be started.

Should the selector switch 204 be set for manual operation, the contacts $S_1$ and $S_3$ will be closed and contacts $S_2$ and $S_4$ will be opened. The pressure switch is thus shunted and the motor will be energized and deenergized alternately solely under control of the thermostatic switch 217—$T_1$—$T_2$ with the exception of an occasional interruption by the thermostatic relay 189—$R_1$—$R_2$. The selector switch may also be set in a neutral position with contacts S₁ and S₄ out of engagement with contacts S₂ and S₃ respectively, so that none of the control circuits can be established.

When the motor 163 is energized shaft 161 is rotated counter-clockwise when looking toward the pulley end of the motor as shown by the arrow in Figure 3. The motion of shaft 141 is clockwise as viewed in Figure 7 and since worm 155 has a left hand helix the shaft 152 will rotate clockwise as shown in Figure 7. Worm 153 has a right hand helix and as a result, the worm wheel 135 and spur gear 137 are given a counter-clockwise rotation as viewed in Figure 7 and the gears 145 and 149 will be similarly rotated so that the gears 121 on the elements will be driven in the reverse direction which is clockwise. This advances the elements toward the sharpened edges of the scraper blade (as will be seen in Figure 3) and the cake formed on the elements will be separated therefrom and will drop to the bottom of the shell where it may be removed through the cleanout openings.

The reduction effected by the gear set (Figure 7) from shaft 141 to shaft 99 is from 1725 R. P. M. to 5.46 R. P. M. Worm 155 has two threads or helices and worm gear 154 has 20 teeth providing a ten to one reduction so that the speed of gear 154 would be 172.5 R. P. M.

Similarly the second worm 153 has two threads or helices and worm gear 135 has twenty teeth giving a second ten to one reduction with the result that gear 137 will rotate at 17.25 R. P. M. This gear has twenty teeth and its meshing ring gear 145 has sixty-nine teeth hence the ring gear and gear 149 which rotates with it will rotate at 17.25×20/69 or 5 R. P. M.

However, since the gear 121 on the element has sixty-five teeth and the gear 149 has seventy-one teeth, there will be an increase in speed of the element in the amount of 5×71/65 or 5.46 R. P. M.

If, for any reason, it becomes necessary to remove the filtering mechanism, a mast may be attached to suitable pads on the shell and after clamps 25 have been loosened and swung out of position, the cover 21 may be removed. This is readily accomplished because the drive connection 157—159 comprises merely an axially separable positive drive clutch.

After removing the head, the nuts may be removed from supports 85 and the hoist chains may be hooked in the eye-bolts 95 and the entire filtering mechanism may be lifted up and out of the shell.

The pressure of the scraper blades may be adjusted by loosening the screws 165 and rotating the hubs 167 relative to the shafts 75 to add to or relieve the compression of spring 181. Tightening the screws will serve to retain the hubs in adjusted position.

It is obvious that various alterations may be made in the size, form, arrangement and construction of parts without departing from the spirit of the invention and for this reason applicant does not desire to be limited solely to the specific embodiment disclosed herein for purposes of explanation but rather he desires protection covering such devices as may fall fairly within the scope of the appended claims.

What I claim to be new and desire to protect by Letters Patent of the United States is:

1. In a filter comprising a casing having an inlet and an outlet, the sub-combination of a manifold forming a fluid chamber, means forming fluid passages in said manifold, a head, a plurality of hollow filtering elements each provided with a fluid passage at one end, means mounting said elements for rotation between said head and manifold with the fluid passage of each element in communication with a passage in said manifold, and means mounted on said head for rotating said element, said manifold, head, elements and rotating means forming a unitary structure removable as a whole from said casing.

2. In a filter comprising a casing having an inlet and an outlet, the sub-combination of a manifold forming a fluid chamber, means forming fluid passages including an outlet in said manifold, a head, a plurality of hollow filtering elements each provided with a fluid passage, means mounting said elements for rotation between said head and manifold with the fluid passage of each element in communication with a passage in said manifold, means mounted between said manifold and said head for scraping the filtering surface of said element, means mounted on said head for rotating said element relative to said scraping means, and means for removably mounting said sub-combination of elements as a unit in said casing with said manifold and casing outlets in communication.

3. In a filter, the combination of a hollow cylindrical filtering element, said hollow portion forming a filtrate chamber, means for scraping the exterior of said element comprising a shaft, means mounting said element and shaft for movement relative to each other, means for fixing said shaft against axial rotation, a plurality of scrapers mounted for free rotation on said shaft, yieldable means individual to each scraper for pressing said scrapers into engagement with said element and means associated with each scraper for adjusting the pressure exerted by its individual yieldable means.

4. In a filter, the combination of a container having a liquid inlet and a filtrate discharge conduit, the latter being formed with a spherical socket, a filtering mechanism comprising a head, a manifold forming a filtrate receiving chamber and a plurality of filtering means supported by said head and manifold and adapted to discharge into said filtrate chamber, an outlet for said chamber having a spherical seat adapted to engage said socket to form a liquid tight connection, said filtering mechanism being removable as a unit from said container by lifting it to disengage said seat and socket.

5. In a filter, the combination of a container having a liquid inlet and a filtrate discharge conduit, the latter being formed with a spherical socket, a cover for the container, power means mounted on said cover and connected to driving means passing through said cover, a filtering mechanism comprising a head, a manifold forming a filtrate receiving chamber, bearings formed in said head and manifold, filtering means rotatably supported in said bearings between said head and manifold and adapted to discharge into said filtrate chamber, gearing connecting said driving means and said filtering means for rotating the latter, said driving means and said gearing each supporting a part of an axially separable coupling which is automatically disconnected upon lifting of the cover, an outlet for said chamber having a spherical seat adapted to engage said socket to form a liquid tight connection, said filtering mechanism being removable as a unit from said container by lifting it to disengage said seat and socket after said cover has been removed.

6. In a filter comprising a casing having an inlet and an outlet, the sub-combination of a manifold forming a fluid chamber, means forming fluid passages including an outlet in said manifold, a head, means for mounting said head in spaced relation with said manifold, a plurality of hollow filtering elements each provided with a fluid passage at one end, means mounting said elements for rotation between said head and manifold with the fluid passage of each element and one of said manifold in communication, said mounting means including means forming a liquid tight connection between the manifold and element, and means for removably mounting said sub-combination of elements as a unit in said casing with said manifold and casing outlets in communication.

7. In a filter, the combination of a hollow cylindrical filtering element, means for scraping the filtering surface of said element comprising a shaft, means mounting said element and said shaft for relative movement about a predetermined axis, means for fixing said shaft against axial rotation, a plurality of scrapers mounted for free rotation on said shaft, yieldable means individual to each scraper for pressing it into engagement with the said element, and a plurality of elements adjustably mounted on said shaft for individually adjusting the pressure exerted by each of said yieldable means.

8. In a filter, the combination of a container, a removable cover for said container, a unitary filtering mechanism removably mounted in said container and comprising a manifold, a head, bearings formed in said manifold and head, and filtering means rotatably mounted in said bearings and disposed between the manifold and said head, power means mounted on said cover and separable power transmission means mounted on said head and cover for connecting said filtering means with said power means.

9. In a filter, the combination of a container having an inlet and an outlet, a unitary filtering mechanism comprising a manifold having a discharge opening, a head, and filtering means disposed therebetween, a support disposed in said container, a channel through said support communicating with said outlet and a separable universal connection between said filtering mechanism and said support, said connection having a conduit in communication with said channel and said opening.

10. In a filter, the combination of a container having an inlet and an outlet, a unitary filtering mechanism comprising a manifold having a discharge opening, a head, and filtering means disposed therebetween, a support disposed in said container, a channel through said support communicating with said outlet and a separable universal connection between said filtering mechanism and said support, said connection having a condnit in communication with said channel and said opening, and means in said container for locking said mechanism in place in said container.

CLEMENT P. GRIFFITH.